(12) United States Patent
Benveniste

(10) Patent No.: US 7,693,117 B2
(45) Date of Patent: Apr. 6, 2010

(54) POWER-SAVING MECHANISM FOR PERIODIC TRAFFIC STREAMS IN WIRELESS LOCAL-AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1445 days.

(21) Appl. No.: 10/736,768

(22) Filed: Dec. 16, 2003

(65) Prior Publication Data

US 2004/0264397 A1 Dec. 30, 2004

Related U.S. Application Data

(60) Provisional application No. 60/433,604, filed on Dec. 16, 2002, provisional application No. 60/497,556, filed on Aug. 26, 2003.

(51) Int. Cl.
*H04W 72/00* (2009.01)
(52) U.S. Cl. .................. 370/338; 370/348; 370/447; 370/449; 370/461; 370/462; 455/450
(58) Field of Classification Search .................. 370/346, 370/338, 318, 468, 447–449, 342, 347, 348, 370/231–235, 236.1–236.2, 395.4, 395.43, 370/461, 462; 455/450, 452.2
See application file for complete search history.

(56) References Cited

U.S. PATENT DOCUMENTS

| 5,297,144 | A | * | 3/1994 | Gilbert et al. .................. 370/346 |
| 5,483,537 | A | * | 1/1996 | Dupuy .......................... 370/337 |
| 5,726,650 | A | * | 3/1998 | Yeoh et al. ...................... 341/70 |
| 5,737,330 | A | * | 4/1998 | Fulthorp et al. ............... 370/346 |
| 5,787,352 | A | * | 7/1998 | Benveniste ................ 455/452.2 |
| 5,809,423 | A | * | 9/1998 | Benveniste ................ 455/452.2 |
| 5,956,643 | A | * | 9/1999 | Benveniste ................ 455/452.1 |
| 6,112,092 | A | * | 8/2000 | Benveniste .................. 455/450 |
| 6,114,968 | A | * | 9/2000 | Ramakrishnan et al. ..... 340/3.51 |
| 6,128,498 | A | * | 10/2000 | Benveniste .................. 455/450 |
| 6,230,016 | B1 | * | 5/2001 | Benveniste .................. 455/450 |
| 6,442,397 | B1 | * | 8/2002 | Benveniste .................. 455/522 |
| 6,496,699 | B2 | * | 12/2002 | Benveniste ................ 455/452.1 |
| 6,807,159 | B1 | * | 10/2004 | Shorey et al. ................ 370/318 |
| 6,891,898 | B2 | * | 5/2005 | Peyla et al. .................. 375/267 |
| 6,980,542 | B2 | * | 12/2005 | Benveniste .................. 370/346 |

(Continued)

OTHER PUBLICATIONS

Laura Marie Feeney ; An Asynchronous Power Save Protocol for Wireless Ad Hoc Networks (Rev. 1.1) (2002).*

(Continued)

*Primary Examiner*—Salman Ahmed
(74) *Attorney, Agent, or Firm*—Chapin IP Law, LLC; David W. Rouille, Esq.

(57) ABSTRACT

A novel method for coordinating the delivery of frames to and the receipt of frames from a power-saving station in a wireless local-area network (LAN) is disclosed. The illustrative embodiment establishes a wake-up schedule for a power-saving station based on a temporal period and temporal offset that reduces the frequency with which multiple stations in a network wake up simultaneously, thereby reducing traffic delays and power consumption. The illustrative embodiment is particularly well-suited to networks with traffic that has delay/jitter quality-of-service (QoS) requirements (i.e., voice calls, videophone calls, etc.).

20 Claims, 7 Drawing Sheets

U.S. PATENT DOCUMENTS

| | | | |
|---|---|---|---|
| 7,006,530 B2 * | 2/2006 | Spinar et al. | 370/468 |
| 7,068,992 B1 * | 6/2006 | Massie et al. | 455/403 |
| 7,154,876 B2 * | 12/2006 | Benveniste | 370/342 |
| 7,180,905 B2 * | 2/2007 | Benveniste | 370/445 |
| 7,245,605 B2 * | 7/2007 | Benveniste | 370/338 |
| 7,333,514 B2 * | 2/2008 | Anehem et al. | 370/474 |
| 7,433,670 B2 * | 10/2008 | Benveniste | 455/343.2 |
| 7,548,531 B2 * | 6/2009 | Benveniste | 370/338 |
| 7,570,613 B2 * | 8/2009 | Benveniste | 370/328 |
| 2003/0023409 A1 * | 1/2003 | Simbirski et al. | 702/188 |
| 2003/0031208 A1 * | 2/2003 | Anehem et al. | 370/474 |
| 2003/0152059 A1 * | 8/2003 | Odman | 370/338 |
| 2003/0203740 A1 * | 10/2003 | Bahl et al. | 455/516 |
| 2004/0105412 A1 * | 6/2004 | He et al. | 370/338 |
| 2006/0146863 A1 * | 7/2006 | Spinar et al. | 370/449 |
| 2007/0058665 A1 * | 3/2007 | Ho et al. | 370/447 |

OTHER PUBLICATIONS

A distributed power management policy for wireless ad hoc networks; Chiasserini, C.F.; Rao, R.R.; Wireless Communications and Networking Conference, 2000. WCNC. 2000 IEEE; vol. 3, Sep. 23-28, 2000 pp. 1209-1213 vol. 3.*

An error control scheme based on adaptation of polling schedule for real-time communication on IEEE 802.11 wireless LANs; Junghoon Lee; Changik Kang; Mikyung Kang; Wireless Personal Multimedia Communications, 2002. The 5th International Symposium on vol. 3, Oct. 27-30, 2002 pp. 1058-1062 vol. 3.*

Traffic adaptive active period control with adaptive backoff window for cluster-based IEEE 802.15.4 wireless sensor networks; Mori, K.; Naito, K.; Kobayashi, H.; Telecommunications, 2009. ICT '09. International Conference on May 25-27, 2009 pp. 125-130.*

* cited by examiner

POWER-SAVING MECHANISM FOR PERIODIC TRAFFIC STREAMS IN WIRELESS LOCAL-AREA NETWORKS

REFERENCE TO RELATED APPLICATIONS

This application claims the benefit of:
1. U.S. provisional patent application Ser. No. 60/433,604, filed 16 Dec. 2002, entitled "Poll Scheduling and Power Saving,",
2. U.S. provisional patent application Ser. No. 60/497,556, filed 26 Aug. 2003, entitled "Power-Saving Mechanisms for 802.11 Clients,"

all of which are also incorporated by reference.

FIELD OF THE INVENTION

The present invention relates to telecommunications in general, and, more particularly, to wireless local area networks.

BACKGROUND OF THE INVENTION

FIG. 1 depicts a schematic diagram of an exemplary wireless local-area network (LAN) 100 in the prior art comprising access point 101 and stations 102-1 through 102-N, wherein N is a positive integer, interconnected as shown. Each station 102-i, wherein i is a member of the set $\{1, 2, \ldots N\}$, is a device such as a notebook computer, personal digital assistant (PDA), tablet PC, etc. that transmits radio signals to and receives radio signals from other stations in local-area network 100 via access point 101.

Access point 101 and stations 102-1 through 102-N transmit data in units referred to as frames over a shared-communications channel such that if two or more stations (or an access point and a station) transmit frames simultaneously, then one or more of the frames can become corrupted (resulting in a collision). As a result, local-area networks typically employ one or more protocols to ensure that a station or access point can gain exclusive access to the shared-communications channel for an interval of time in order to transmit its frames. Frames transmitted from a station 102-i to access point 101 are referred to as uplink frames, and frames transmitted from access point 101 to a station 102-i are referred to as downlink frames.

In accordance with some protocols (e.g., Institute of Electrical and Electronics Engineers [IEEE] 802.11, etc.), access point 101 periodically broadcasts a special frame called a beacon to all of the stations 102-1 through 102-N. The beacon contains a variety of information that enables stations to establish and maintain communications in an orderly fashion, such as a timestamp, which enables stations to synchronize their local clocks, and signaling information (e.g., channel number, frequency hopping pattern, dwell time, etc.).

A station 102-i can prolong its battery life by powering off its radio when not transmitting or receiving. When a station powers off its radio, the station is said to enter the doze state. A station wakes up from the doze state by powering on its radio to enter the alert state. While a station is in the doze state, it cannot transmit or receive signals, and is said to be asleep. A station that saves battery life by alternating between alert to doze states is said to be in power-save mode, and a station that employs power-save mode is said to be a power-saving station.

While a station 102-i is asleep, access point 101 buffers any downlink frames for station 102-i for eventual delivery when station 102-i wakes up. Three issues therefore arise when a station 102-i is in power-save mode:

(1) When should station 102-i wake up?
(2) How will access point 101 know that station 102-i has awakened?
(3) How will access point 101 know that station 102-i has gone to back to doze state?

One strategy, which is used in the IEEE 802.11-1999 standard, is for the access point 101 to include periodically in the beacon a Traffic Indication Map (TIM) that identifies which stations in power-save mode have downlink frames waiting for them in access point 101's buffer. When a station wakes up and the TIM indicates that there are frames buffered at access point 101 for the station, the station sends a Power Save (PS) poll frame to access point 101 to request delivery of a buffered frame, and, after receiving and acknowledging the downlink frame, goes back to the doze state. A separate PS poll frame must be transmitted for each downlink frame buffered at access point 101.

In another strategy, known as Automatic Power-Save Delivery (APSD), the delivery of downlink buffered frames can occur automatically—that is, without special signaling frames to notify access point 101 that a station is awake and ready to receive frames.

Another feature of APSD relates to the termination of the awake period, the time interval a power-saving station must remain awake. A power-saving station may stay awake to receive several buffered frames, and goes to back to sleep when it is notified by access point 101.

There are different variations of APSD possible, which differ with respect to when delivery takes place and signaling for the end of a awake period. With the variation that has come to be known as beacon-based APSD, access point 101 periodically includes a Traffic Indication Map in the beacon to identify which stations in power-save mode have downlink frames waiting for them in the access point 101's buffer, as in the 802.11-1999 power-save method. After transmitting a beacon with a TIM, access point 101 transmits its buffered downlink frames.

In accordance with beacon-based APSD, stations in the doze state wake up to receive beacons and check the TIM. If the TIM indicates that there are no buffered downlink frames for a station 102-i, then station 102-i immediately goes back into the doze state; otherwise, station 102-i stays awake to receive the buffered downlink frames from access point 101, and then goes back into power-save mode. In addition, a station in the doze state buffers uplink frames generated by the application layer, and transmits one or more of the buffered uplink frames upon wake-up. Prior to entering power-save mode, a station sends a message to access point 101 that specifies a beacon period for subsequent wake-up (e.g., wake-up every 10 beacons, etc.) and an offset (i.e., phase), thereby identifying the beacons at which the station will wake up. The awake period is terminated by access point 101's notifying the station (e.g., via specially designated bits in the control field(s) of a frame, etc.) that there are no more frames buffered at the access point awaiting transmission.

SUMMARY OF THE INVENTION

The present invention is based on the identification of three drawbacks of the Automatic Power-Save Delivery mechanism. First, it is possible for multiple stations in a network to repeatedly wake up at the same time (i.e., at the same beacons), resulting in traffic delays and, consequently, an increase in station power consumption. Second, the Automatic Power-Save Delivery mechanism is ill-suited for traffic with delay/jitter quality-of-service (QoS) requirements (i.e., voice calls, videophone calls, etc.) because wake-up periods based on multiples of beacon intervals are too large for the inter-frame arrival times required for adequate call quality. Finally, it is possible for a power-saving station to waste battery life waiting for the last buffered frame to be received before it goes back to sleep if low priority downlink traffic does not receive higher priority treatment, which would be expected in a local-area network that supports QoS.

In order to overcome these drawbacks, in the illustrative embodiment of the present invention, a station, prior to entering power-save mode, sends a request to access point 101 that specifies a desired temporal period for subsequent wake-up that is independent of beacons. Access point 101 determines, based on existing transmission schedules (e.g., polling schedules, wake-up schedules, etc.), whether to accept or reject the request. If access point 101 accepts the request, then access point 101 determines, based on existing wake-up schedules, a temporal offset that will reduce the occurrence of concurrent wake-ups, and sends a positive notice with the temporal offset to the station. If access point 101 rejects the request, then access point 101 sends a negative notice to the station denying the request.

In the illustrative embodiment, a station might optionally send to access point 101, in addition to the desired temporal period, a suggested temporal offset. Access point 101 can either decide to use the suggested temporal offset if it will result in a sufficiently low rate of collisions (e.g., concurrent wake-ups, etc.) or access point 101 can select a new temporal offset accordingly.

In the illustrative embodiment, a power-saving station can go back to sleep when it receives a frame with an end-of-awake-period control field that is enabled. The awake period can be terminated while there is traffic still buffered at access point 101. This enables access point 101 to manage its downlink transmissions according to the priority of traffic at the access point without forcing power-saving stations to stay awake until all traffic buffered for them has been transmitted.

For the purposes of this specification, the term "temporal offset" is used to indicate either (i) a relative value (i.e., phase) with respect to a temporal period, or an absolute starting time (i.e., the time at which a periodic sequence starts).

The illustrative embodiment of the present invention is advantageous for aperiodic traffic (e.g., bursty, random, etc.) as well as periodic traffic (e.g., call traffic, etc.).

The illustrative embodiment comprises: (a) receiving a temporal period associated with a wake-up schedule for a device that has a power-save mode; (b) determining, based on one or more existing transmission schedules, whether the temporal period can be accommodated; and (c) when the temporal period can be accommodated, (i) determining a temporal offset for the wake-up schedule, and (ii) transmitting to the device a positive notice comprising the temporal offset.

DETAILED DESCRIPTION

Figure 1:
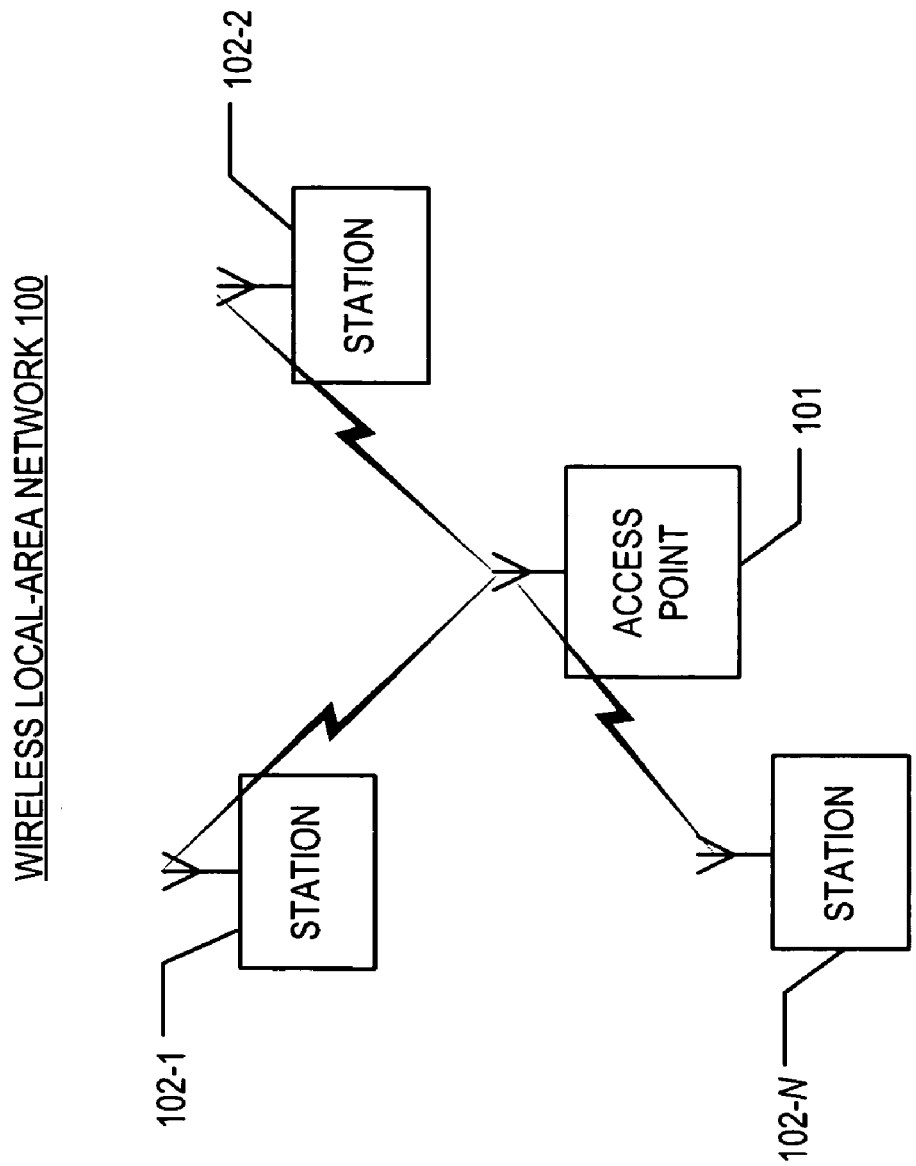
FIG. 1 depicts a schematic diagram of an exemplary wireless local-area network 100 in the prior art.
Figure 2:
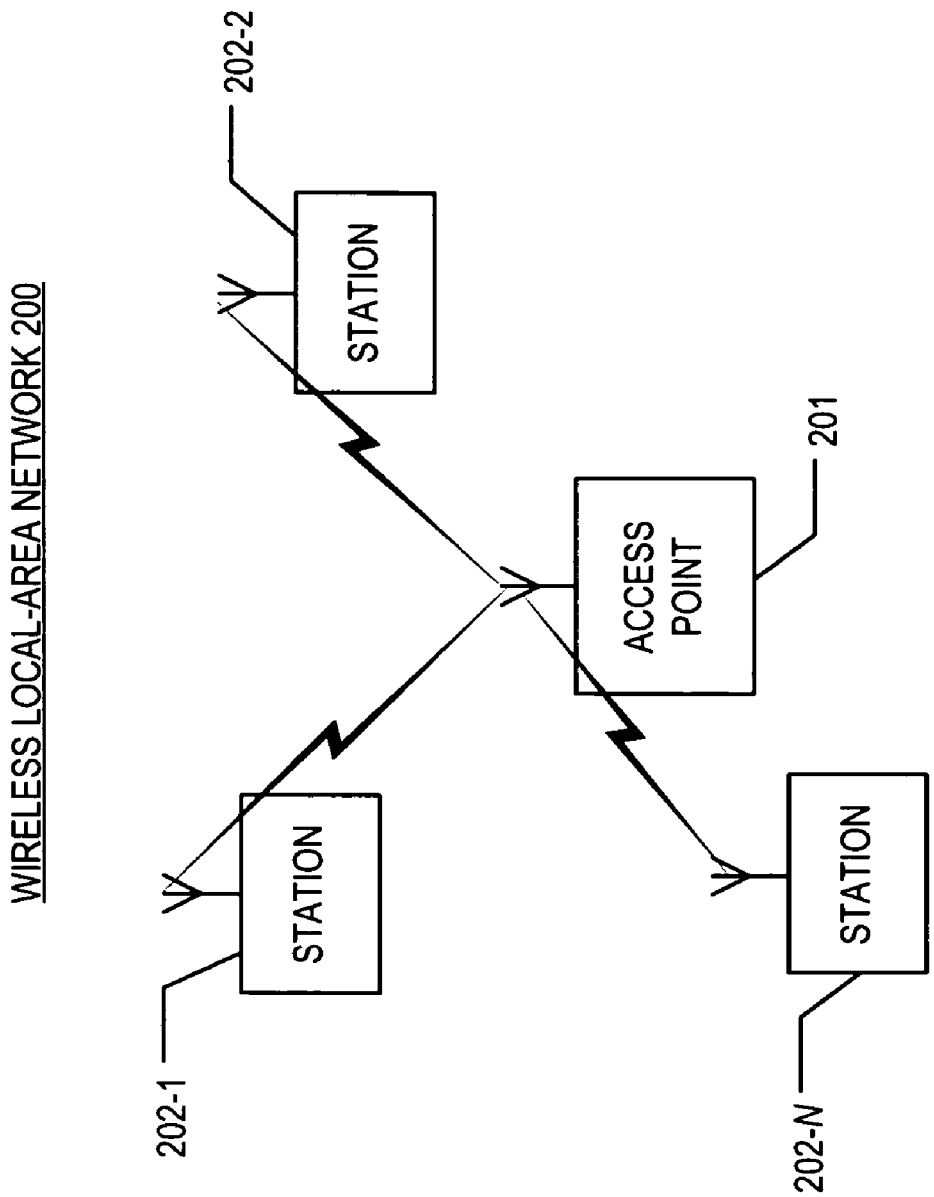
FIG. 2 depicts a schematic diagram of a portion of local-area network 200 in accordance with the illustrative embodiment of the present invention.

FIG. 2 depicts a schematic diagram of local-area network 200 in accordance with the illustrative embodiment of the present invention. Local-area network 200 comprises access point 201, and stations 202-1 through 202-N, wherein i is a positive integer in the set $\{1, \ldots N\}$, interconnected as shown.

Station 202-i is capable of (i) generating frames, (ii) transmitting frames over a shared-communications channel to access point 201, and (iii) receiving frames from the shared-communications channel. In some embodiments, station 202-i might also able to communicate in peer-to-peer fashion (i.e., transmitting to and receiving frames from other stations directly instead of via access point 201). Station 202-i is capable of entering power-save mode and of receiving and transmitting frames while in power-save mode as described below and with respect to FIG. 6.

Access point 201 is capable of receiving frames from and transmitting frames to stations 202-1 through 202-N via a shared-communications channel. Access point 201 is also capable of buffering downlink frames for a power-saving station in doze state, and of delivering buffered downlink frames to power-saving stations as described below and with respect to FIG. 5.

Figure 3:
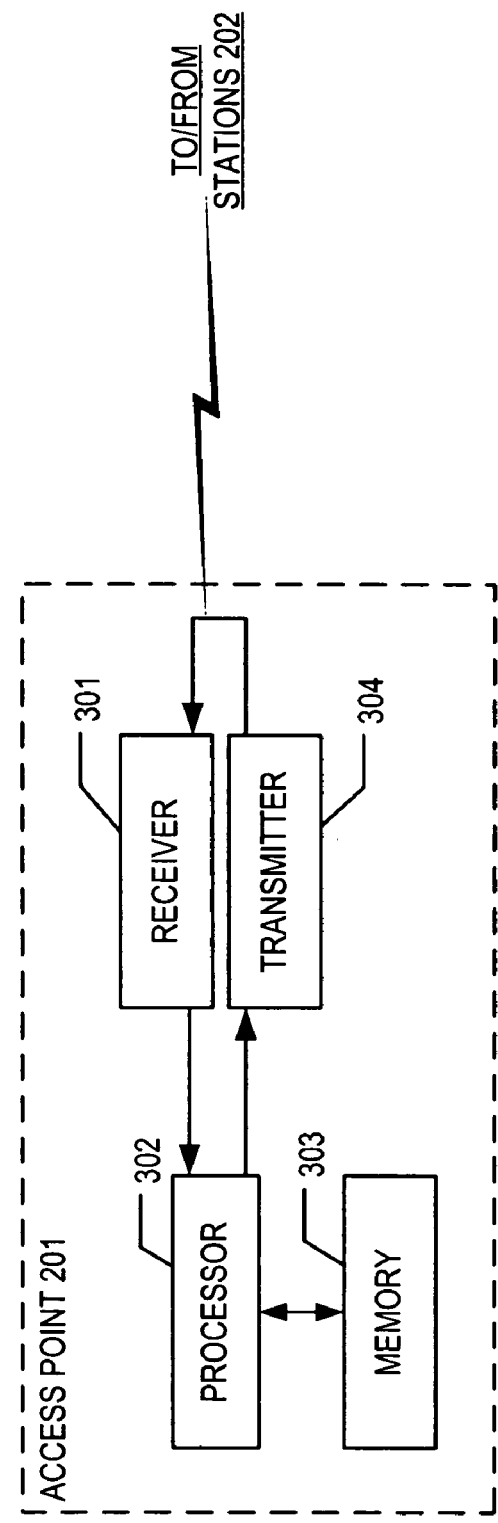
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving frames from shared communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 5. In some alternative embodiments of the present invention, processor 302 might be a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of receiving frames from processor 302, in well-known fashion, and of transmitting them on shared communications channel 203. It will be clear to those skilled in the art how to make and use transmitter 304.

Figure 4:
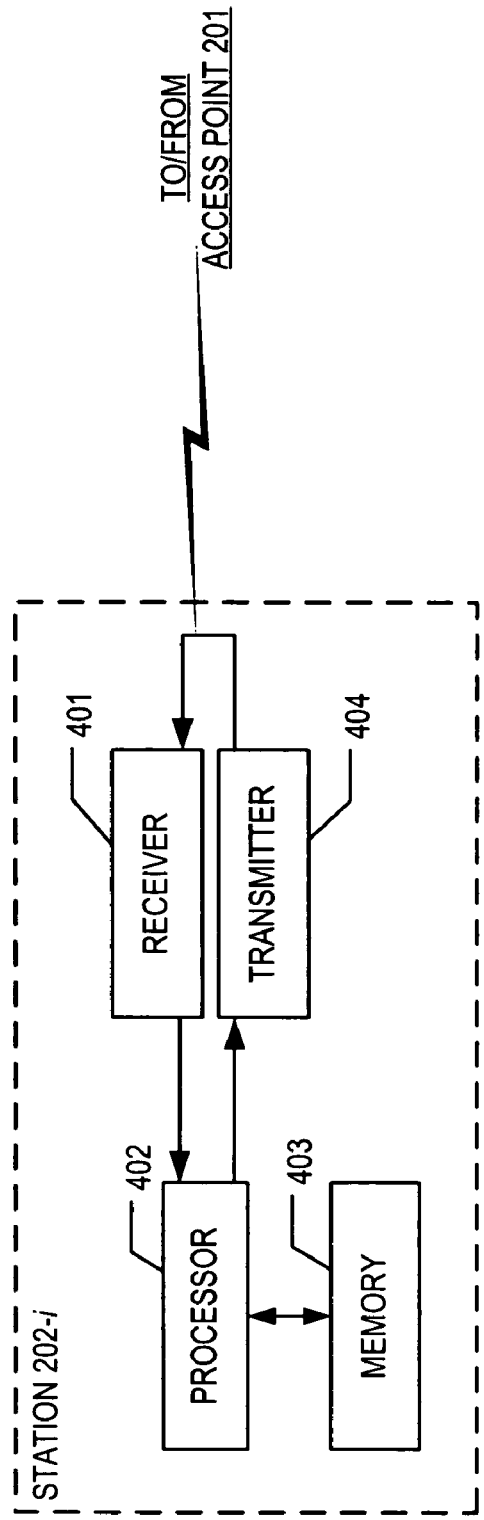
FIG. 4 depicts a block diagram of the salient components of station 202-i, as shown in FIG. 2, in accordance with the illustrative embodiment of the present invention.

FIG. 4 depicts a block diagram of the salient components of station 202-i, in accordance with the illustrative embodiment of the present invention. Station 202-i comprises receiver 401, processor 402, memory 403, and transmitter 404, interconnected as shown.

Receiver 401 is a circuit that is capable of receiving frames from shared-communications channel 203, in well-known fashion, and of forwarding them to processor 402. Receiver 401 is also capable of being powered off for a doze state. It will be clear to those skilled in the art how to make and use receiver 401.

Processor 402 is a general-purpose processor that is capable of executing instructions stored in memory 403, of reading data from and writing data into memory 403, of instructing receiver 401 and transmitter 404 to power off, and of executing the tasks described below and with respect to FIG. 6. In some alternative embodiments of the present invention, processor 402 is a special-purpose processor (e.g., a network processor, etc.). In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art, after reading this specification, how to make and use memory 403.

Transmitter 404 is a circuit that is capable of receiving frames from processor 402, in well-known fashion, and of transmitting them on shared communications channel 203. Transmitter 404 is also capable of being powered off for a doze state. It will be clear to those skilled in the art how to make and use transmitter 404.

In the illustrative embodiment of the present invention, access point 201 and stations 202-1 through 202-N support at least one IEEE 802.11 protocol. In alternative embodiments of the present invention, access point 201 and stations 202-1 through 202-N might support other protocols in lieu of, or in addition to, one or more IEEE 802.11 protocols. Furthermore, in some embodiments of the present invention local-area network 200 might comprise an alternative shared-communications channel (for example, wireline instead of wireless). In all such cases, it will be clear to those skilled in the art after reading this specification how to make and use access point 201 and stations 202-1 through 202-N.

Figure 5:
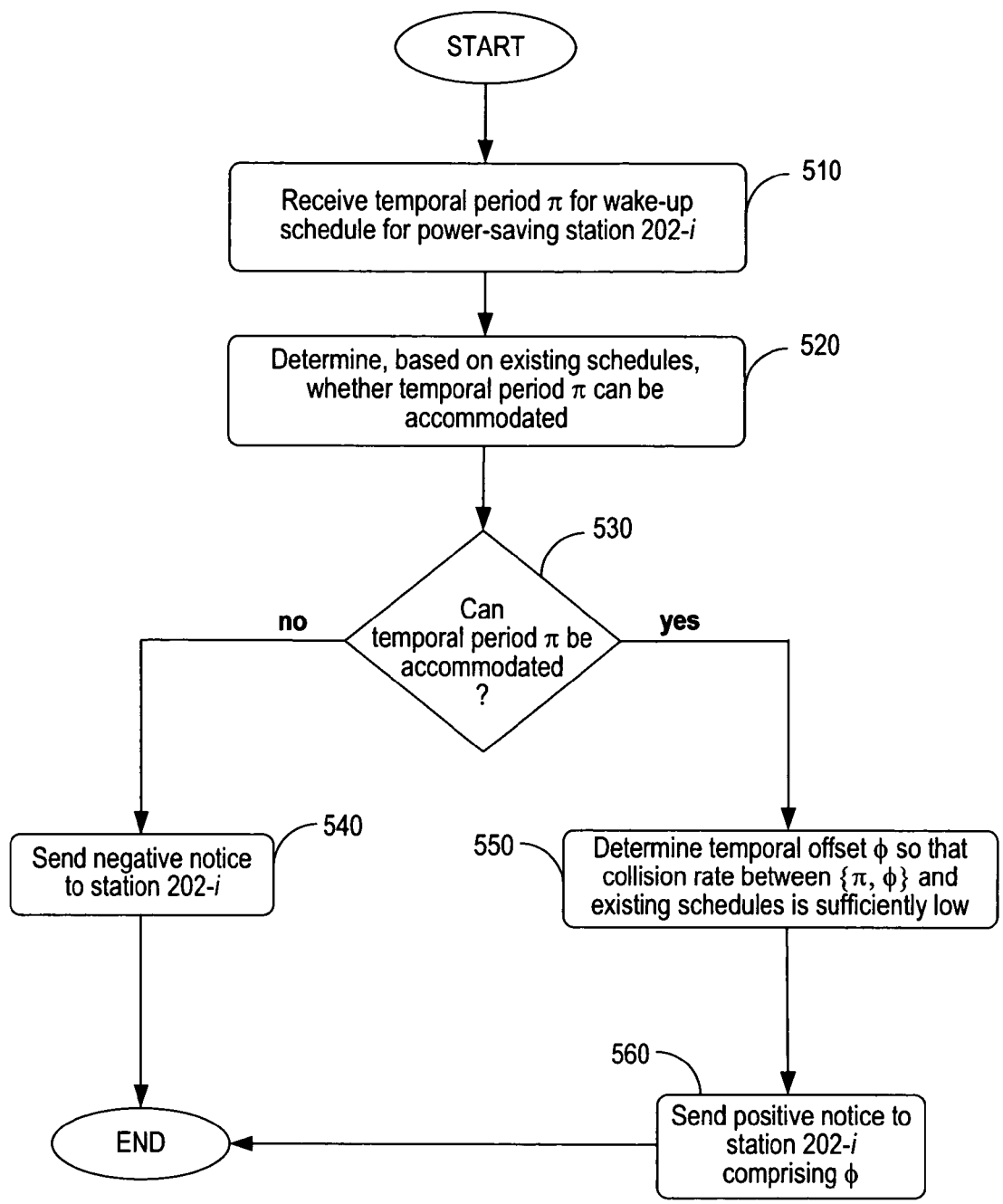
FIG. 5 depicts a flowchart for access point 201, as shown in FIG. 2, for a first method of establishing a wake-up schedule for a power-saving station in accordance with the illustrative embodiment of the present invention.

FIG. 5 depicts a flowchart for access point 201 for a first method of establishing a wake-up schedule for a power-saving station, in accordance with the illustrative embodiment of the present invention. It will be clear to those skilled in the art which tasks depicted in FIG. 5 can be performed simultaneously or in a different order than that depicted.

At task 510, access point 201 receives a temporal period $\pi$ for a desired wake-up schedule for power-saving station 202-i, in well-known fashion. As will be appreciated by those skilled in the art, in some embodiments temporal period $\pi$ might be embedded in a message that contains other kinds of information (e.g., a traffic specification [TSPEC] message in an IEEE 802.11e network, etc.), while in some other embodiments, temporal period $\pi$ might be sent via a special-purpose message. In the former case, the message might also contain a field that indicates that station 202-i is in power-save mode, while in the latter case, this is implicitly indicated by the special-purpose message.

At task 520, access point 201 determines, based on existing schedules (e.g., wake-up schedules for other power-saving stations, polling schedules, etc.), whether temporal period $\pi$ can be accommodated (i.e., whether the shared-communications channel can handle the additional "load" of the desired wake-up schedule without the rate of collisions exceeding a particular threshold T.)

Task 530 is a branch statement based on the result of task 520; if a new wake-up schedule with temporal period $\pi$ cannot be accommodated, execution proceeds to task 540, otherwise execution continues at task 550.

At task 540, access point 201 sends a negative notice frame to station 202-i that indicates that the desired wake-up schedule cannot be accommodated. In some embodiments, the negative notice might indicate that no additional load can be accommodated by access point 201, while in some other embodiments, the negative notice might indicate that station 202-i might try an alternative method of power-saving, while in still some other embodiments, the negative notice might indicate a suggested alternative method of power-saving. After completion of task 540, the method of FIG. 5 terminates.

At task 550, access point 201 determines a value for temporal offset $\phi$ that will keep the rate of collisions between the new wake-up schedule and existing schedules below threshold T. In some cases, access point 201 might also need to make adjustments to one or more of the existing schedules in order to keep the rate of collisions below threshold T.

At task 560, access point 201 sends a positive notice frame to station 202-i that indicates the temporal offset $\phi$ for station 202-i's wake-up schedule. After completion of task 560, the method of FIG. 5 terminates.

After completion of FIG. 5, access point 201 buffers downlink frames for station 202-i and automatically transmits buffered frames in accordance with station 202-i's wake-up schedule. Access point 201 can either transmit all of the buffered frames to station 202-i, or can transmit a portion of the frames and indicate the end of the transmission by enabling an end-of-awake period control field in the last frame. This provides access point 201 with the flexibility to manage its downlink transmissions (e.g., according to traffic class priorities, etc.) without forcing station 202-i to stay awake until all its buffered frames are received.

As will be appreciated by those skilled in the art, although FIG. 5 is disclosed as a method to be performed by access point 201, in some embodiments in which local-area network 200 (i) has one or more non-power-saving stations in addition to power-saving station 202-i, and (ii) supports peer-to-peer communications, FIG. 5 might be performed either by one of the non-power-saving stations, or by power-saving station 202-i itself, instead of access point 201. In the latter case, the communications-oriented tasks of FIG. 5 (510, 540, and 560) need not be performed by station 202-i.

Figure 6:
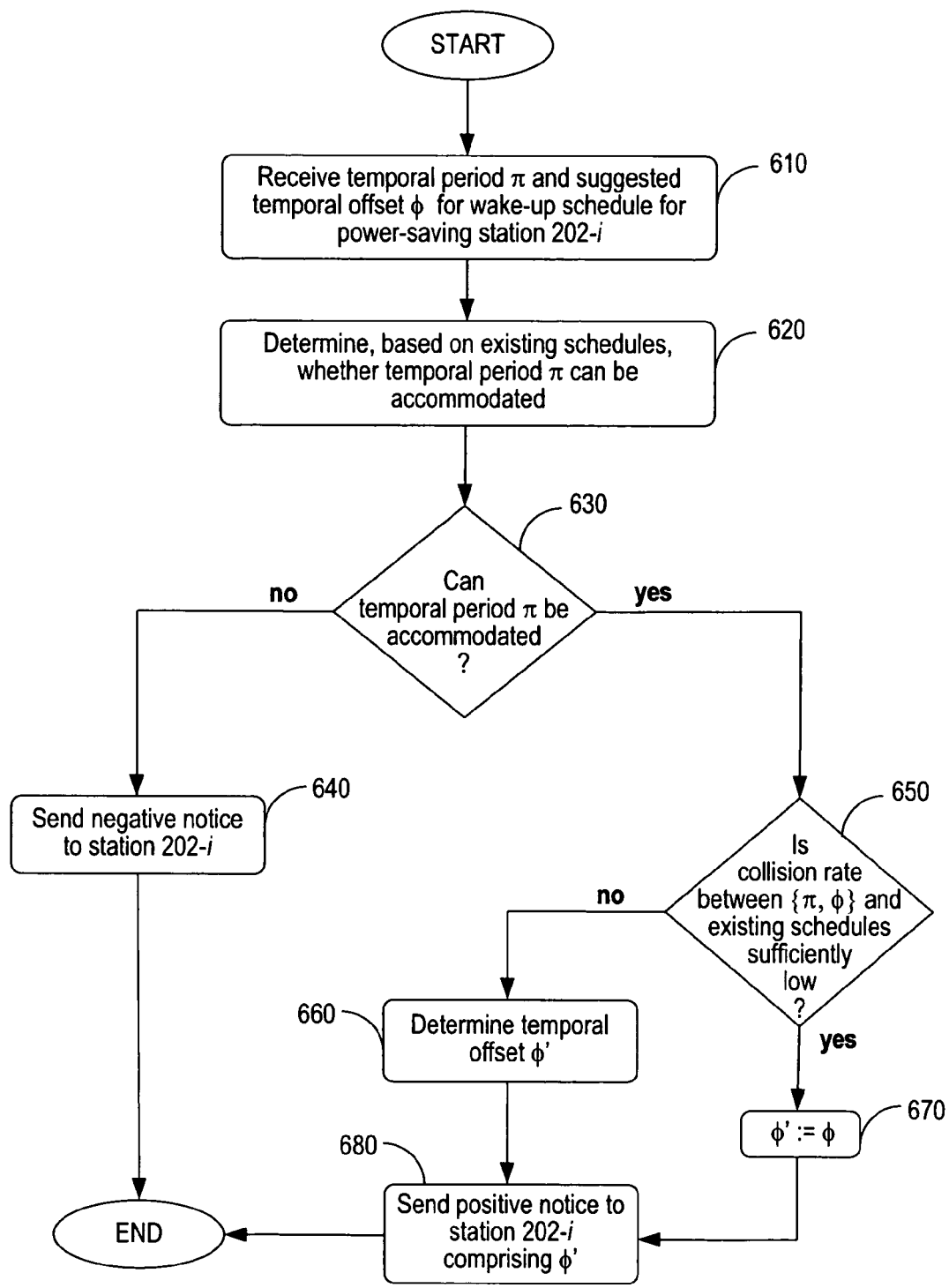
FIG. 6 depicts a flowchart for access point 201, as shown in FIG. 2, for a second method of establishing a wake-up schedule for a power-saving station in accordance with the illustrative embodiment of the present invention.

FIG. 6 depicts a flowchart for access point 201 for a second method of establishing a wake-up schedule for a power-saving station, in accordance with the illustrative embodiment of the present invention. It will be clear to those skilled in the art which tasks depicted in FIG. 6 can be performed simultaneously or in a different order than that depicted.

At task 610, access point 201 receives a temporal period $\pi$ and a suggested temporal offset $\phi$ for a desired wake-up schedule for power-saving station 202-i, in well-known fashion. As will be appreciated by those skilled in the art, in some embodiments temporal period $\pi$ and offset $\phi$ might be embedded in a message that contains other kinds of information (e.g., a traffic specification [TSPEC] message in an IEEE 802.11e network, etc.), while in some other embodiments, temporal period π and offset φ might be sent via a special-purpose message. In the former case, the message might also contain a field that indicates that station 202-i is in power-save mode, while in the latter case, this is implicitly indicated by the special-purpose message.

At task 620, access point 201 determines, based on existing schedules (e.g., wake-up schedules for other power-saving stations, polling schedules, etc.), whether temporal period it can be accommodated (i.e., whether the shared-communications channel can handle the additional "load" of the desired wake-up schedule without the rate of collisions exceeding a particular threshold T.) This determination is made independent of the suggested temporal offset φ.

Task 630 is a branch statement based on the result of task 620; if a new wake-up schedule with temporal period π cannot be accommodated, execution proceeds to task 640, otherwise execution continues at task 650.

At task 640, access point 201 sends a negative notice frame to station 202-i that indicates that the desired wake-up schedule cannot be accommodated. In some embodiments, the negative notice might indicate that no additional load can be accommodated by access point 201, while in some other embodiments, the negative notice might indicate that station 202-i might try an alternative method of power-saving, while in still some other embodiments, the negative notice might indicate a suggested alternative method of power-saving. After completion of task 640, the method of FIG. 6 terminates.

At task 650, access point 201 determines whether the suggested temporal offset φ will keep the rate of collisions between the new wake-up schedule and existing schedules below threshold T. If not, execution proceeds to task 660, otherwise execution continues at task 670.

At task 660, access point 201 determines a temporal offset φ' that will keep the rate of collisions between the new wake-up schedule and existing schedules below threshold T. After completion of task 660, execution continues at task 680.

At task 670, access point 201 sets temporal offset φ' to the same value as suggested temporal offset φ.

At task 680, access point 201 sends a positive notice frame to station 202-i that indicates the temporal offset φ' for station 202-i's wake-up schedule. After completion of task 680, the method of FIG. 6 terminates.

After completion of FIG. 5, access point 201 buffers downlink frames for station 202-i and automatically transmits buffered frames in accordance with station 202-i's wake-up schedule. Access point 201 can either transmit all of the buffered frames to station 202-i, or can transmit a portion of the frames and indicate the end of the transmission by enabling an end-of-awake-period control field in the last frame. This provides access point 201 with the flexibility to manage its downlink transmissions (e.g., according to traffic class priorities, etc.) without forcing station 202-i to stay awake until all its buffered frames are received.

As will be appreciated by those skilled in the art, although FIG. 6 is disclosed as a method to be performed by access point 201, in some embodiments in which local-area network 200 (i) has one or more non-power-saving stations in addition to power-saving station 202-i, and (ii) supports peer-to-peer communications, FIG. 6 might be performed either by one of the non-power-saving stations, or by power-saving station 202-i itself, instead of access point 201. In the latter case, the communications-oriented tasks of FIG. 6 (610, 640, and 680) need not be performed by station 202-i.

Figure 7:
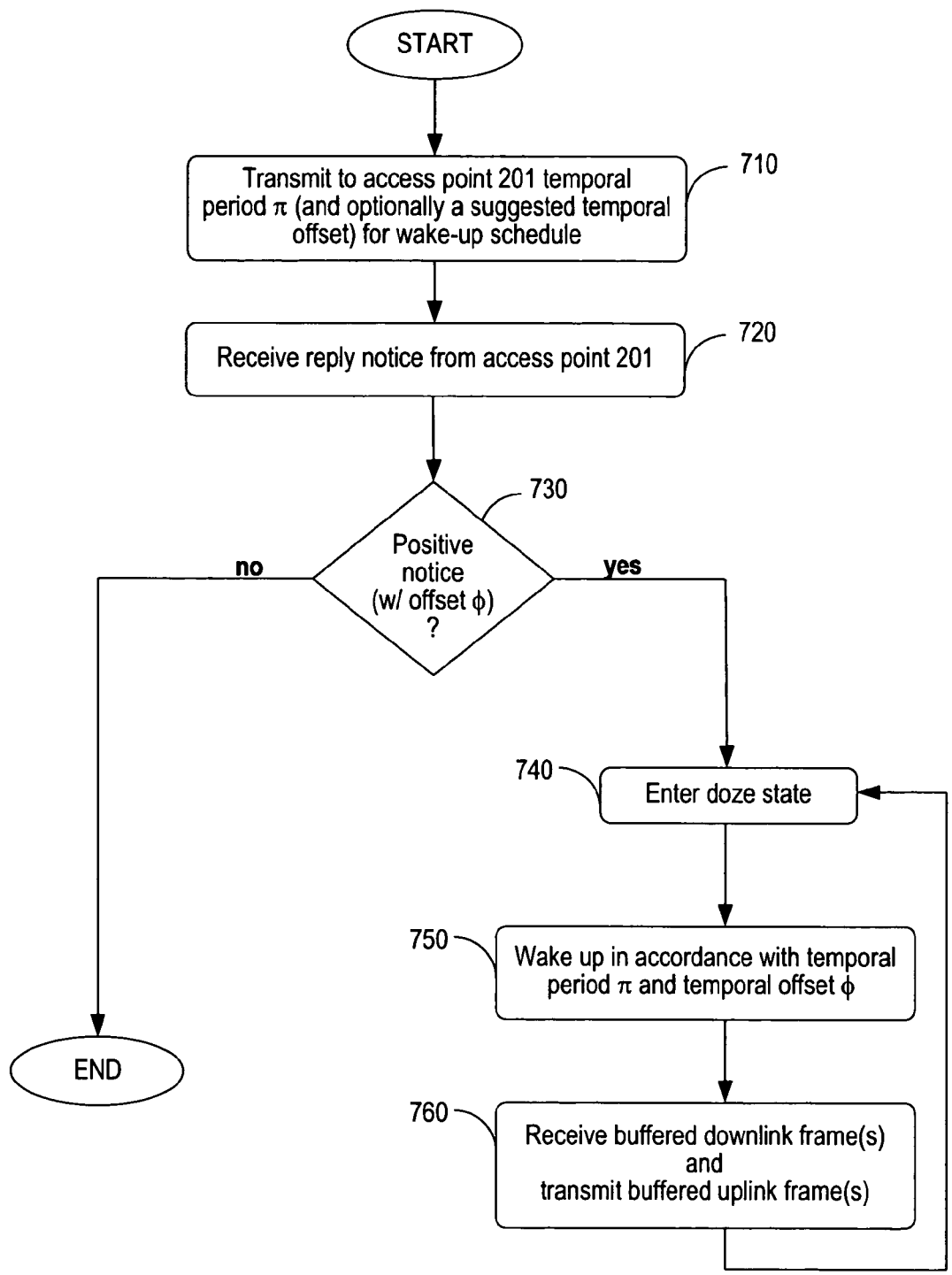
FIG. 7 depicts a flowchart for station 202-i, as shown in FIG. 2, for entering and operating in power-saving mode, in accordance with the illustrative embodiment of the present invention.

FIG. 7 depicts a flowchart for station 202-i for entering and operating in power-saving mode, in accordance with the illustrative embodiment of the present invention.

At task 710, station 202-i transmits to access point 201, in well-known fashion, a temporal period π, and optionally, a suggested temporal offset, for its desired wake-up schedule. As will be appreciated by those skilled in the art, in some embodiments temporal period π and suggested offset φ might be embedded in a message that contains other kinds of information (e.g., a traffic specification [TSPEC] message in an IEEE 802.11e network, etc.), while in some other embodiments, temporal period π and suggested offset φ might be sent via a special-purpose message. In the former case, the message might also contain a field that indicates that station 202-i is in power-save mode, while in the latter case, this is implicitly indicated by the special-purpose message. As will further be appreciated by those skilled in the art, in some embodiments in which local-area network 200 supports peer-to-peer communications, station 202-i might transmit π and to a non-power-saving station.

At task 720, station 202-i receives a reply notice from access point 201, in well-known fashion. As will be appreciated by those skilled in the art, in some embodiments station 202-i might receive the reply notice from a non-power-saving station.

At task 730, station 202-i checks whether the reply notice received at task 720 is a positive notice comprising a temporal offset φ, or a negative notice. If it is a negative notice, the method of FIG. 7 terminates, otherwise execution continues at task 740.

At task 740, station 202-i enters a doze state.

At task 750, station 202-i wakes up in accordance with temporal period π and temporal offset φ.

At task 760, station 202-i receives one or more downlink frames and transmits one or more buffered uplink frames, in well-known fashion. As will be appreciated by those skilled in the art, in the case of contention-based access to the shared-communications channel (e.g., the Distributed Coordination Function [DCF] in IEEE 802.11b, the Extended Distributed Coordination Function [EDCF] in IEEE 802.11e, etc.), access point 201, having the highest-priority access to the channel, first transmits the buffered downlink frames to station 202-i, and then station 202-i, after gaining access to the channel, transmits its buffered uplink frames to access point 201. In order to achieve greater power-save performance for power-saving stations that employ a contention-based access mechanism, access point 101 refrains from transmitting following its transmission to station 202-i, for a period of time sufficiently long to enable a power-saving station to gain access to the channel.

As will be appreciated by those skilled in the art, in the case of contention-free access to the shared-communications channel (e.g., the Polling Coordination Function [PCF] in IEEE 802.11b, the Hybrid Coordination Function [HCF] in IEEE 802.11e, etc.), transmission of downlink and uplink frames occurs in interleaved fashion. As described above, station 202-i stays awake to receive downlink frames until either an end-of-awake-period frame or a conventional end-of-sequence frame is received. After completion of task 760, execution continues back at task 740.

As will be appreciated by those skilled in the art, in some embodiments in which local-area network 200 supports peer-to-peer communications and has one or more non-power-saving stations in addition to power-saving station 202-i, the communications-oriented tasks of FIG. 7 (710, 720, and 760) (i) might be performed with respect to one of the non-power-saving stations instead of access point 201, or (ii) might not be performed at all when power-saving station 202-i itself performs the methods of FIGS. 5 and 6, as described above.

Although the illustrative embodiment of the present invention is disclosed in the context of IEEE 802.11 local-area networks, it will be clear to those skilled in the art after reading this specification how to make and use embodiments of the present invention for other kinds of networks and network protocols.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A computer-implemented method comprising:
   (a) receiving a temporal period associated with a wake-up schedule for a device that has a power-save mode, said temporal period based on existing transmission schedules and wherein said temporal period is utilized for subsequent wake-ups independent of beacons;
   (b) determining, based on one or more existing schedules, whether said temporal period can be accommodated, wherein a temporal offset is based on existing wake-up schedules and is utilized to reduce an occurrence of concurrent wake-ups, and wherein said temporal offset indicates a relative time with respect to said temporal period; and
   (c) when said temporal period can be accommodated,
      (i) determining a temporal offset for said wake-up schedule, and
      (ii) transmitting to said device a positive notice comprising said temporal offset.

2. The method of claim 1 further comprising:
   (d) when said temporal period cannot be accommodated, transmitting to said device a negative notice.

3. The method of claim 1 wherein (i) comprises selecting a value for said temporal offset so that the rate of collisions between said wake-up schedule and said one or more existing schedules is below a threshold.

4. The method of claim 1 further comprising:
   (a1) receiving a suggested temporal offset associated with said wake-up schedule.

5. The method of claim 4 wherein (i) comprises setting said temporal offset to said suggested temporal offset when the rate of collisions between said suggested temporal offset and said one or more existing schedules is below a threshold.

6. The method of claim 1 further comprising:
   (iii) transmitting a signal to said device in accordance with said temporal period and said temporal offset.

7. The method of claim 6 further comprising:
   (iv) refraining from transmitting to enable one or more stations that have said power-save mode to transmit a frame.

8. The method of claim 6 wherein said signal comprises at least one of: a poll, and a plurality of frames.

9. The method of claim 1 further comprising:
   (iv) receiving a signal from said device in accordance with said temporal period and said temporal offset.

10. The method of claim 9 wherein said signal comprises a plurality of frames.

11. The method of claim 1 wherein said receiving and said transmitting are via a shared-communications channel.

12. A computer implemented method comprising:
   (a) transmitting a temporal period associated with a wake-up schedule for a power-save mode, said temporal period based on existing transmission schedules and wherein said temporal period is utilized for subsequent wake-ups independent of beacons;
   (b) receiving a temporal offset in response to (a), wherein said temporal offset is based on existing wake-up schedules and is utilized to reduce an occurrence of concurrent wake-ups, and wherein said temporal offset indicates a relative time with respect to said temporal period;
   (c) entering said power-save mode;
   (d) waking up from said power-save mode in accordance with said temporal period and said temporal offset; and
   (e) receiving a first signal when awake.

13. The method of claim 12 wherein said first signal comprises a poll.

14. The method of claim 12 wherein said first signal comprises a plurality of downlink frames.

15. The method of claim 12 further comprising:
   (f) transmitting a second signal when awake.

16. The method of claim 12 wherein said receiving and said transmitting are via a shared-communications channel.

17. A computer implemented method comprising:
   (a) transmitting a temporal period and a suggested temporal offset associated with a wake-up schedule for a power-save mode, said temporal period based on existing transmission schedules and wherein said temporal period is utilized for subsequent wake-ups independent of beacons, wherein said temporal offset is based on existing wake-up schedules and is utilized to reduce an occurrence of concurrent wake-ups, and wherein said temporal offset indicates a relative time with respect to said temporal period;
   (b) receiving a temporal offset based on at least one of:
      (i) said suggested temporal offset, and
      (ii) one or more existing schedules;
   (c) entering said power-save mode;
   (d) waking up from said power-save mode in accordance with said temporal period and said temporal offset; and
   (e) transmitting a first signal when awake.

18. The method of claim 17 wherein said first signal comprises a plurality of frames.

19. The method of claim 17 further comprising:
   (f) receiving a second signal when awake.

20. The method of claim 19 wherein said second signal comprises a plurality of frames.

* * * * *